Nov. 21, 1944.                K. EHRGOTT ET AL                2,363,303
                              VIBRATION PICKUP
                             Filed July 31, 1942
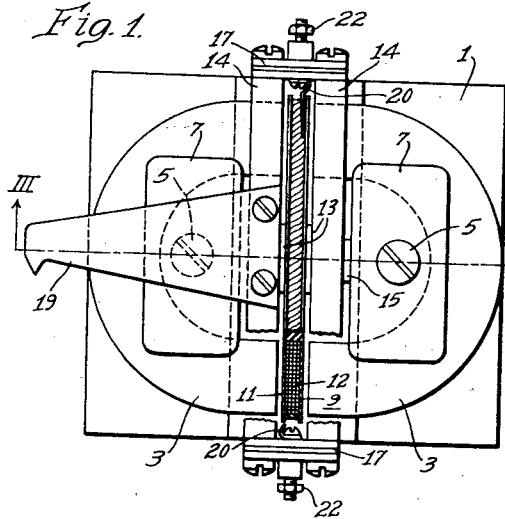
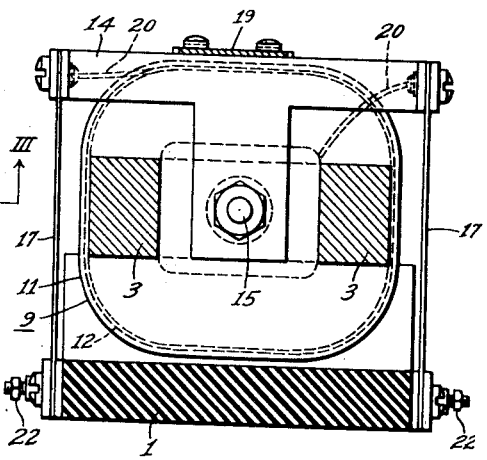
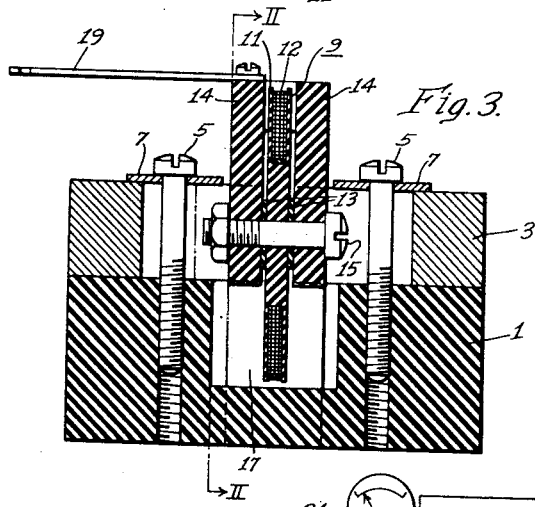
WITNESSES:
INVENTORS
Karl Ehrgott and
Arthur C. Hagg.
BY Paul E. Friedemann
ATTORNEY Patented Nov. 21, 1944

2,363,303

UNITED STATES PATENT OFFICE 2,363,303

VIBRATION PICKUP

Karl Ehrgott, Baltimore, Md., and Arthur C. Hagg, Forest Hills, Pa., assignors to Westinghouse Electric & Manufacturing Company, East Pittsburgh, Pa., a corporation of Pennsylvania Application July 31, 1942, Serial No. 453,076

7 Claims. (Cl. 171—209)

Our invention relates to vibration measuring devices such as those useful in measuring the vibratory motion caused by unbalanced conditions in rotating wheels, rotors, shafts, etc.

More specifically, our invention relates to a vibration pickup device of the moving coil velocity type.

An object of our invention is to provide a vibration pickup device of simple rugged construction having inherently accurate and positive response to vibrations.

An ancillary object of our invention is to provide in a device of the character referred to vibration transmitting means that will move the movable coil only in response to vibrations in the plane in which the vibration is being measured.

Other objects and advantages will become more apparent from a study of the following specification when considered in conjunction with the accompanying drawing, in which:

Figure 1 is a plan view of our vibration pickup device;

Fig. 2 is a sectional view taken on the line II—II of Fig. 3;

Fig. 3 is a sectional view taken on the line III—III of Fig. 1; and

Fig. 4 is a schematic showing of an application of our vibration pickup.

Referring now to the drawing, numeral 1 denotes a base member, or supporting structure, of molded insulating material having a channel shaped cross-section upon which the vibration pickup is assembled. A pair of U-shaped permanent magnets 3 are positioned and secured with their opposite poles in confronting relation on the upwardly extending portions of the base member by means of bolts 5 extending through the clamping plates 7 and into the base member 1, or by other convenient means. By positioning the opposite poles of the U-shaped magnets in confronting relation with a suitable air gap therebetween two magnetic fields are formed. The distance or air gaps between the extremities of the magnets is of sufficient width to permit positioning of the coil structure 9 therein. The coil structure 9 comprises a substantially flat rectangular molded form 11 of insulating material, the periphery of which is deeply grooved to have wound therein a coil 12. The coil structure 9 is positioned and spaced by washers 13 between a pair of T-shaped insulating support members 14 and secured by the bolt 15 extending therethrough; it is so supported and positioned in the magnetic field by the flat springs 17 secured on one of their ends to the base member 1 and on the other of their ends secured to and bridging the extremities of the T-shaped members 14, that each magnetic field has a diametrically opposite coil portion positioned centrally therein. The flat springs 17, by reason of their substantial width and thus their high mechanical resistance to laterally applied deflecting forces and in addition to supporting the coil assembly in the magnetic fields, provide freedom of transverse movement therethrough in a single plane only (i. e. the plane of the coil) as viewed in Fig. 1, and also serve as biasing means for maintaining the point of the prod 19, secured to one of the T-shaped members, against a vibrating element, thus providing means for the coil to follow the vibratory motion of said element. Force applications to the point of the prod 19 apply a torque to the coil support which acts substantially about the vertical axis of the coil assembly. This turning moment, however, is countered by a reaction torque resulting from the high lateral stiffness of the flat springs 17. Hence, the coil moves only in the plane which it defines, transversely of the airgaps between the confronting pole extremities of the permanent magnets 3.

To avoid having the leads 20 from the coil 12 interfering with the coil freedom, they have been electrically connected to the upper ends of the supporting springs 17, the lower ends of which have terminals 22 connected thereto. With this construction the supporting springs 17 are utilized as conductors of induced currents in the coil and slight transverse movements thereof are not impeded by external resistance such as may be the case were the leads brought out directly from the coil.

It should here be stated that the coil structure is made of lightweight material and the design is such that the elements comprising the movable coil assembly are kept at a minimum with the result that the inertia of the coil assembly is a very low value thereby facilitating faithful followup movements of the coil of the vibratory motion. It is therefore possible to measure vibrations up to relatively high frequencies without introducing errors from this source.

The prod 19 is of the form of a tapered flat strip, at its wide extremity being secured to a T-shaped member and at its narrow extremity terminates in a point, which projects in the direction of coil freedom and rides against the vibrating element. It is extremely stiff in the direction or plane of the vibration but is resilient in other planes. This construction provides great resistance to deflection in the plane of the vibration being measured so that true vibratory motion of the vibrating element may be transmitted to the movable coil 9. In addition it provides resilience in a plane at right angles to the vibration plane to prevent tilting of the coil in the magnetic fields. It most importantly permits the point of the prod to maintain its point of contact with the vibrating element to eliminate undesired coil movements in response to vibratory motion of the vibrating element in any plane except that plane in which the vibratory motion is being measured. In short, any motion except the desired motion of the vibrating element is eliminated from the coil motion by this novel form of prod. The importance of eliminating error from this source cannot be over-stressed. Numerous amplifier designs have been developed in which provision has been made for filtering out errors introduced from various sources, but none can correct this error introduced from the vibration pickup source, since the specific error is purely mechanical. It is therefore seen that a correct analysis of the vibration is obtainable only if the absolute coil motion is the same as the amplitude of the vibration.

Voltage in the coil 12 is induced by slight transverse movements thereof in the magnetic field and is proportional to the velocity of coil motion at any instant. Stated another way, the response of the pickup is linear with frequency if the amplitude of the motion is fixed. With a fixed frequency the response is linear with amplitude of motion. The voltage induced in the coil with a high resistance load such as offered by an amplifier has essentially a fixed phase angle relationship with the vibration thus making it possible to accurately determine the angular location of the unbalance in a rotating body.

The design of the pickup inherently incorporates simplicity of accurate assembly and long life. Deterioration of the permanent magnets is reduced to a minimum by providing a fixed air gap thereby maintaining a fixed pickup calibration and voltage phase angle relationship to the vibration over long periods of service. The general ruggedness and simplicity of construction measurably reduce the possibilities of damage to the coil or misalignment of parts during normal handling and use. Accurate coil position is easily obtainable during assembly by inserting spacing strips (not shown) of suitable thickness between the magnet faces and the sides of the coil form and thereafter securing the upper extremities of the flat supporting springs to the coil assembly, all of which combine to increase the efficiency and accuracy of performance.

Fig. 4 illustrates an application for which our vibration pickup is particularly adapted. The figure shows a top view of one side of the front or steering wheel assembly of an automobile or truck having a wheel 21 angularly movable about a kingpin axis 23. The wheel assembly on this side is supported above the ground by means of a jack positioned beneath the wheel assembly as indicated at 25. It may be seen that upon rotation of the wheel 21 at some predetermined speed any unbalanced condition therein will develop torques about the kingpin axis which will cause the wheel and spindle to angularly oscillate about said axis in a substantially horizontal plane. In this application the pickup prod 19 is positioned against the end of the spindle or an extension thereto 27 so that it may lie in the plane of the vibration. The pickup coil 12 is in circuit with a suitable amplifier 29 which supplies the necessary current to a meter 31 which measures the amount of unbalance and also through which amplifier the voltage induced in the pickup coil fires the stroboscopic light 33.

Movement of the coil structure 9 transversely of the magnetic fields in response to the angular oscillating motion of the spindle will intermittently flash the stroboscopic light 33 at some known point on the amplified voltage cycle of the pickup to effect "freezing" of the wheel. The angular position of tire markings, or other obvious characteristics such as the valve stem may then be noted, in addition the amount of the unbalance is indicated by the meter 31. The wheel upon being stopped is then angularly positioned as noted under the stroboscopic light. Since the phase angle of the vibration system is known, the position of the wheel under the stroboscopic light, by proper interpretation, indicates the angular location of the unbalance. The amount of the unbalance is fairly accurately indicated by the maximum amplitude of vibration. The proper amount of weight is then attached to the outside edge of the wheel rim to eliminate the angular oscillating movement about the kingpin.

We are, of course, aware that others, particularly after having had the benefits of the teachings of our invention, may devise other devices embodying our invention, and we do not wish to be limited to the specific showing made in the drawing or the descriptive disclosure hereinbefore made, but wish to be limited only by the scope of the appended claims.

We claim as our invention:

1. An electromagnetic pickup unit for detecting vibrations comprising, in combination, a base, a pair of permanent magnets secured thereto having their opposite poles in confronting relation, a flat movable coil, a plurality of resilient link means for yieldably supporting said coil centrally between the confronting pole faces of said permanent magnets and allowing transverse movement thereof in the plane of the coil only through the magnetic fields formed between the confronting poles, means for transmitting motion from a vibrating element to said coil and into which coil is induced a voltage proportional to transverse movement thereof through said magnetic fields.

2. An electromagnetic pickup unit for detecting vibrations comprising, in combination, a base, a pair of U-shaped permanent magnets secured thereto having their opposite poles in confronting relation thereby forming two magnetic fields therebetween, a flat rectangular movable coil, a plurality of resilient link means for yieldably supporting a diametrically opposite coil portion centrally in each of said magnetic fields and allowing transverse movement of said coil therethrough in the plane of the coil only, means for transmitting vibratory motion from a vibrating element to said movable coil said means transmitting only vibratory motion in the desired plane of vibration and effectively eliminating the transmittal of motion due to vibration in any other plane, and into which coil is induced a voltage proportional to movement of said diametrically opposite coil portions transversely of said magnetic fields.

3. An electromagnetic pickup unit for detecting vibrations comprising, in combination, a base, a pair of permanent magnets secured thereto having their opposite poles in confronting relation, a flat movable coil, means for supporting said coil including a plurality of resilient link means for yieldably supporting said coil centrally between the confronting pole faces of said permanent magnets and allowing transverse movement thereof in the plane of the coil only through the magnetic fields formed between the confronting poles, means for transmitting motion from a vibrating element to said coil comprising a flat tapered resilient strip at its wide extremity being secured to said means for supporting the coil, said strip having its greatest resistance to deflection in the plane of the vibration and its least resistance to deflection in the plane at right angles to said vibration plane, said coil having a voltage induced therein proportional to the transverse movement thereof through said magnetic fields.

4. An electromagnetic pickup unit for detecting vibrations comprising, in combination, a base, a pair of U-shaped permanent magnets secured thereto having their opposite poles in confronting relation thereby forming two magnetic fields therebetween, a flat rectangular movable coil, means for supporting said coil including a plurality of resilient link means for yieldably supporting a diametrically opposite coil portion centrally in each of said magnetic fields and allowing transverse movement of said coil therethrough in the plane of the coil only, means for transmitting vibratory motion from a vibrating element to said movable coil, comprising a flat tapered resilient strip at its wide extremity being secured to said means for supporting the coil, said strip having its greatest resistance to deflection in the plane of the vibration and its least resistance to deflection in the plane at right angles to said vibration plane said coil having a voltage induced therein proportional to movement of said diametrically opposite coil portions transversely of said magnetic fields.

5. An electromagnetic vibration pickup device comprising, in combination, a base, field magnets disposed on said base having their opposite poles in confronting relation thereby forming a plurality of magnetic air gaps, a flat rectangular coil having a pair of leads, a support for said coil, a pair of flat springs each secured at one extremity to said support and at the other extremity secured to said base for yieldably supporting said coil for movement transversely of said magnetic air gaps, said coil leads being each connected to a spring extremity secured to the coil support, a terminal connected to each spring extremity secured to said base, a prod secured to the coil support for moving the coil transversely of the magnetic air gaps upon engagement of the prod with a vibrating element whereby a voltage proportional to such movements is induced in the coil, said flat springs conducting the currents in said coil to said terminals.

6. An electromagnetic pickup unit for detecting vibrations comprising, in combination, a base, a pair of U-shaped permanent magnets secured to said base having their opposite poles in confronting relation whereby two magnetic fields are formed therebetween, a flat rectangular coil having a pair of leads, a support for said coil, a plurality of resilient links each secured at one extremity to said support and at the other extremity secured to said base for yieldably supporting a diametrically opposite coil portion in each of said magnetic fields and providing movement of the coil transversely of the magnetic fields in the plane of the coil only, said coil leads being each connected to the link extremities secured to the coil support, a terminal connected to each link extremity secured to the base, a flat tapered resilient strip secured at its wide extremity to the support for said coil for moving the coil transversely of said magnetic fields upon engagement of said strip with a vibrating element, said strip having its greatest resistance to deflection in the plane of the vibration and its least resistance to deflection in a plane at right angles to the plane of the vibration, said coil having a voltage induced therein proportional to movements thereof transversely of said magnetic fields, and said resilient links conducting currents in said coil to said terminals.

7. In an electromagnetic pickup device for detecting vibrations, in combination, a pair of oppositely disposed field magnets, a flat rectangular coil resiliently disposed for freedom of movement transversely only of a magnetic field between said field magnets, a flat tapered resilient strip-like member rigidly secured at its wide extremity with respect to said coil and projecting from a side thereof, and at its narrow extremity terminating in a point projecting in the direction of coil freedom, said point being adapted to engage a vibrating element whereby vibratory movements of said element transversely of said strip, in the plane thereof, are transmitted to said coil.

KARL EHRGOTT.
ARTHUR C. HAGG.